United States Patent
Sengiku (10) Patent No.: US 8,368,267 B2
(45) Date of Patent: Feb. 5, 2013

(54) POWER TOOL

(75) Inventor: Hitoshi Sengiku, Anjo (JP)

(73) Assignee: Makita Corporation, Anjo (JP)

( * ) Notice: Subject to any disclaimer, the term of this patent is extended or adjusted under 35 U.S.C. 154(b) by 231 days.

(21) Appl. No.: 12/735,225

(22) PCT Filed: Dec. 25, 2008

(86) PCT No.: PCT/JP2008/073609
§ 371 (c)(1),
(2), (4) Date: Aug. 6, 2010

(87) PCT Pub. No.: WO2009/084589
PCT Pub. Date: Jul. 9, 2009

(65) Prior Publication Data
US 2011/0031825 A1 Feb. 10, 2011

(30) Foreign Application Priority Data
Dec. 27, 2007 (JP) .................. 2007-337008

(51) Int. Cl.
*H02K 11/00* (2006.01)
*H02K 5/00* (2006.01)
(52) U.S. Cl. ............................ 310/71; 310/50
(58) Field of Classification Search ............. 310/50, 310/71, 89
See application file for complete search history.

(56) References Cited

U.S. PATENT DOCUMENTS

| 4,370,579 A * | 1/1983 | Kobayashi et al. | 310/50 |
| 4,748,353 A * | 5/1988 | Klingenstein et al. | 310/50 |
| 4,926,075 A | 5/1990 | Fushiya et al. | |
| 5,006,742 A | 4/1991 | Strobl et al. | |
| 2007/0205679 A1 * | 9/2007 | Terauchi et al. | 310/71 |
| 2007/0210658 A1 * | 9/2007 | Terauchi et al. | 310/68 B |
| 2008/0150377 A1 * | 6/2008 | Yamaguchi et al. | 310/71 |

FOREIGN PATENT DOCUMENTS

| DE | 43 09 382 A1 | 9/1994 |
| JP | U-61-84658 | 6/1986 |
| JP | A-1-174251 | 7/1989 |
| JP | U-2-110959 | 9/1990 |
| JP | A-6-233490 | 8/1994 |
| JP | A-6-319247 | 11/1994 |
| JP | A-8-118260 | 5/1996 |

OTHER PUBLICATIONS

Feb. 3, 2009 International Search Report issued in corresponding International Patent Application No. PCT/JP2008/073609 (with translation).

* cited by examiner

*Primary Examiner* — Quyen Leung
*Assistant Examiner* — Alex W Mok
(74) *Attorney, Agent, or Firm* — Oliff & Berridge, PLC (57) ABSTRACT

A power tool includes a motor housing, a motor, a motor-side terminal, a switch block, and a switch-side terminal provided on the switch block to be connected to the motor-side terminal. A hollow tubular member is provided on one of the motor housing and the switch block and extends in a longitudinal direction of the motor housing, and a fitting member is provided on the other of the motor housing and the switch block and fitted in the tubular member. The motor-side terminal and the switch-side terminal are connected to each other within a hollow of the tubular member. As long as the motor-side terminal and the switch-side terminal are at least connected to each other, the tubular member and the fitting member are held in the fitted state so that a connection between the terminals is isolated from the outside of the tubular member.

10 Claims, 8 Drawing Sheets

POWER TOOL

FIELD OF THE INVENTION

The invention relates to a power tool having a motor for driving a tool bit, and more particularly to a technique of dust-proofing a terminal connection of a motor.

BACKGROUND OF THE INVENTION

Japanese laid-open utility model publication No. 61-84658 discloses a power tool in which a motor-side terminal and a power-side terminal are connected to each other via a plug-and-socket type connection. According to the known power tool, a plug-type terminal which is provided on a power-supply wiring assembly side to be connected to a power switch is inserted into a socket-type terminal which is provided on a motor side to be connected to a coil terminal of a stator.

In a known power tool, outside air is introduced into the internal space of a housing in order to cool a motor. For example, if the known power tool is represented by a disc grinder which is used to grind or polish metal materials, metal chips generated by the operation may possibly enter into the internal space of the housing together with outside air. If the terminal connection is loosened due to vibration or other causes during grinding or polishing operation and part of the terminal connection is exposed to the internal space, metal chips which have entered the internal space may come into contact with the exposed portion and cause leakage of current. Therefore, the known terminal connection has a problem in dust resistance and further improvement is required in this point.

SUMMARY OF THE INVENTION

It is, accordingly, an object of the invention to improve dust resistance of a terminal connection in a power tool with a motor.

Above-described object can be achieved by a claimed invention. A representative power tool according to the invention includes a motor housing, a motor housed within the motor housing, a motor-side terminal provided on the motor, a switch block opposedly mounted to one longitudinal end of the motor housing and having an operating part which can be operated to start and stop the motor, and a switch-side terminal provided on the switch block to be connected to the motor-side terminal. A tool bit is driven by the motor via a power transmitting mechanism and thereby caused to perform a predetermined operation. The "power tool" in this invention typically represents a motor-driven power tool such as a disc grinder which is used for grinding or polishing operation. The "motor" in this invention represents a stator which is a motor component, and thus the "motor-side terminal" in this invention represents a coil terminal of a stator winding on the stator. Further, the "switch-side terminal" in this invention typically represents a supply terminal which is connected to the coil terminal of the stator winding.

According to the preferred embodiment of the power tool in this invention, a hollow tubular member is provided on one of the motor housing and the switch block and extends in a longitudinal direction of the motor housing, and a fitting member is provided on the other of the motor housing and the switch block and fitted in the tubular member. The motor-side terminal and the switch-side terminal are connected to each other within a hollow of the tubular member, and as long as the motor-side terminal and the switch-side terminal are at least connected to each other, the tubular member and the fitting member are held in the fitted state so that a connection between the terminals is isolated from the outside of the tubular member. To "isolate" in this invention means to isolate the connection between the motor-side terminal and the switch-side terminal from the outside of the tubular member by housing the connection within the space of the tubular member. Further, to be "held" in this invention means to maintain the fitted state until the motor-side terminal and the switch-side terminal are disconnected from each other by relative movement of the motor housing and the switch block away from each other, for example, due to vibration.

According to this invention, with the construction in which, as long as the motor-side terminal and the switch-side terminal are at least connected to each other, the tubular member and the fitting member are held in the fitted state so that a connection between the motor-side terminal and the switch-side terminal is isolated from the outside of the tubular member, metal chips or the like which are generated during operation using the power tool and may enter the motor housing together with cooling air for cooling the motor can be prevented from sticking to the terminal connection. Thus, leakage of current or short circuit which may be caused by sticking of the metal chips or the like to the terminal connection can be prevented.

According to a further aspect of the invention, one of the motor-side terminal and the switch-side terminal may preferably comprise a socket and the other comprises a plug that is inserted into the socket along the longitudinal direction of the motor housing, and plug-in connection between the socket and the plug is made within the hollow of the tubular member. Further, when the switch block is mounted to one end of the motor housing along the longitudinal direction of the motor housing, the tubular member and the fitting member are fitted together along the longitudinal direction of the motor housing, and simultaneously by said fitting action, the plug is inserted into the socket.

According to this invention, with the construction in which the motor-side terminal and the switch-side terminal are connected in the form of a plug and a socket and the plug is inserted into the socket by utilizing the action of fitting the fitting member into the tubular member when the switch block is mounted to the motor housing, the motor-side terminal and the switch-side terminal can be connected upon mounting the switch block to the motor housing. Thus the ease of mounting operation can be increased.

According to a further embodiment of the power tool in this invention, a stator of the motor and the switch block are mounted to the motor housing from opposite directions along the longitudinal direction of the motor housing. Further, the tubular member is formed on the motor housing, and the fitting member is formed on a front end of the stator of the motor and a front end of the switch block in their respective mounting directions. In order to mount the stator of the motor and the switch block to the motor housing, the motor-side fitting member and the switch block-side fitting member are fitted into the tubular member, and this fitting guides the stator of the motor and the switch block to be mounted to the motor housing. Thus, according to this invention, with the construction in which the tubular member and the fitting members to be fitted in the tubular member have a function of guiding the mounting of the stator of the motor and the switch block to the motor housing, the efficiency of the mounting operation can be increased.

According to this invention, dust resistance of a terminal connection in a power tool can be improved. Other objects, features and advantages of the present invention will be

REPRESENTATIVE EMBODIMENT OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
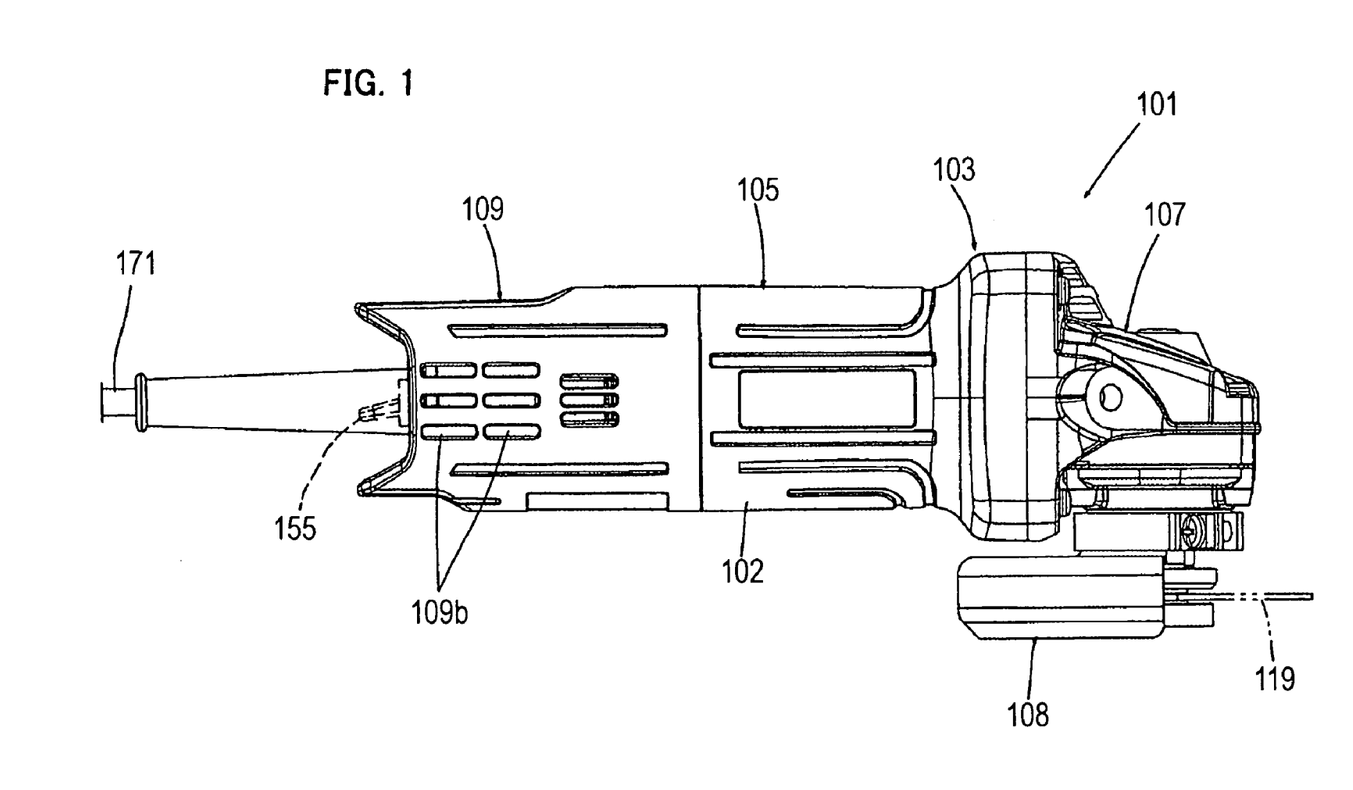
FIG. 1 is a side view showing an entire structure of an electric disc grinder.
Figure 2:
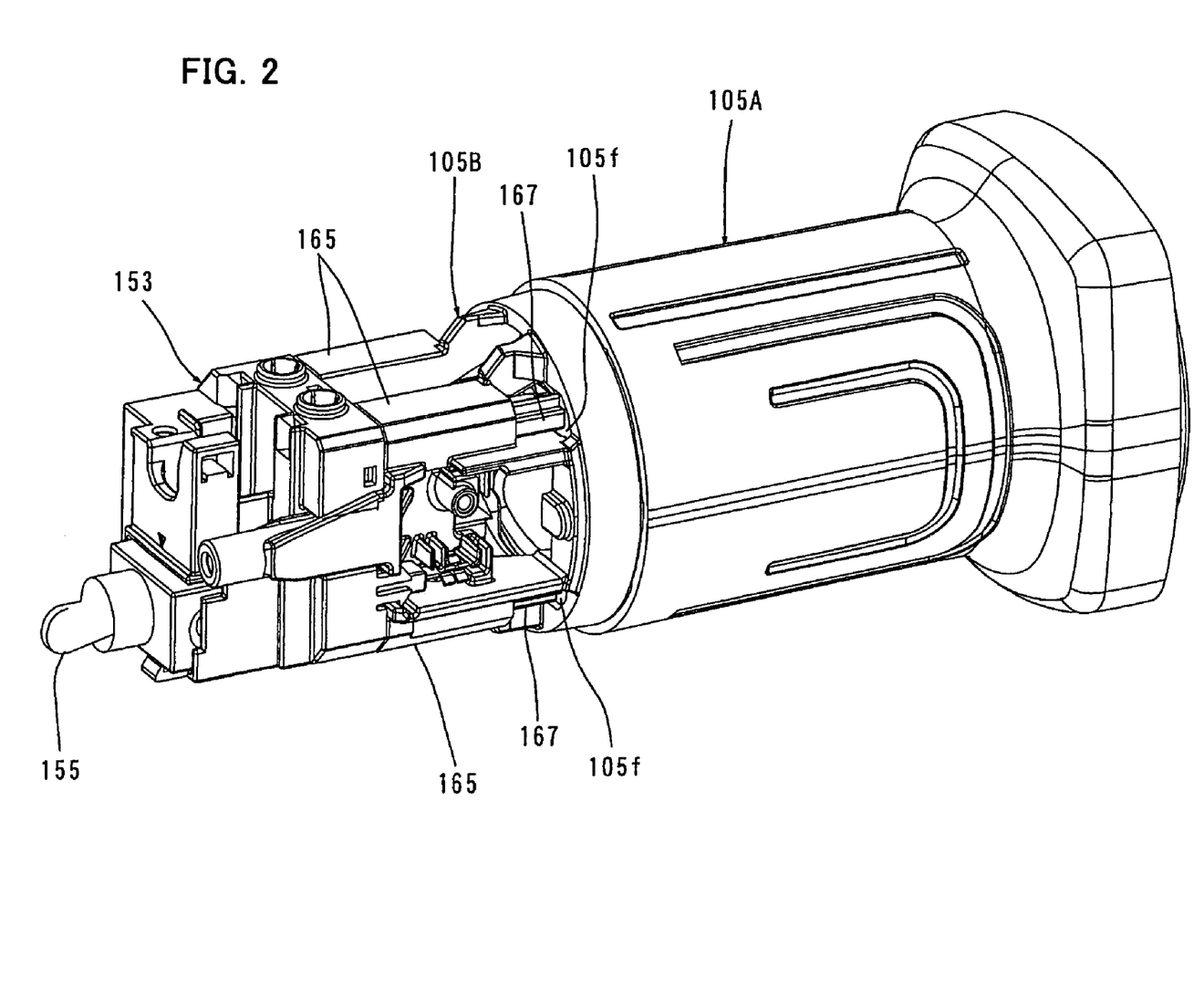
FIG. 2 is a perspective view showing a switch block mounted to a motor housing, with a rear cover removed and not shown.
Figure 3:
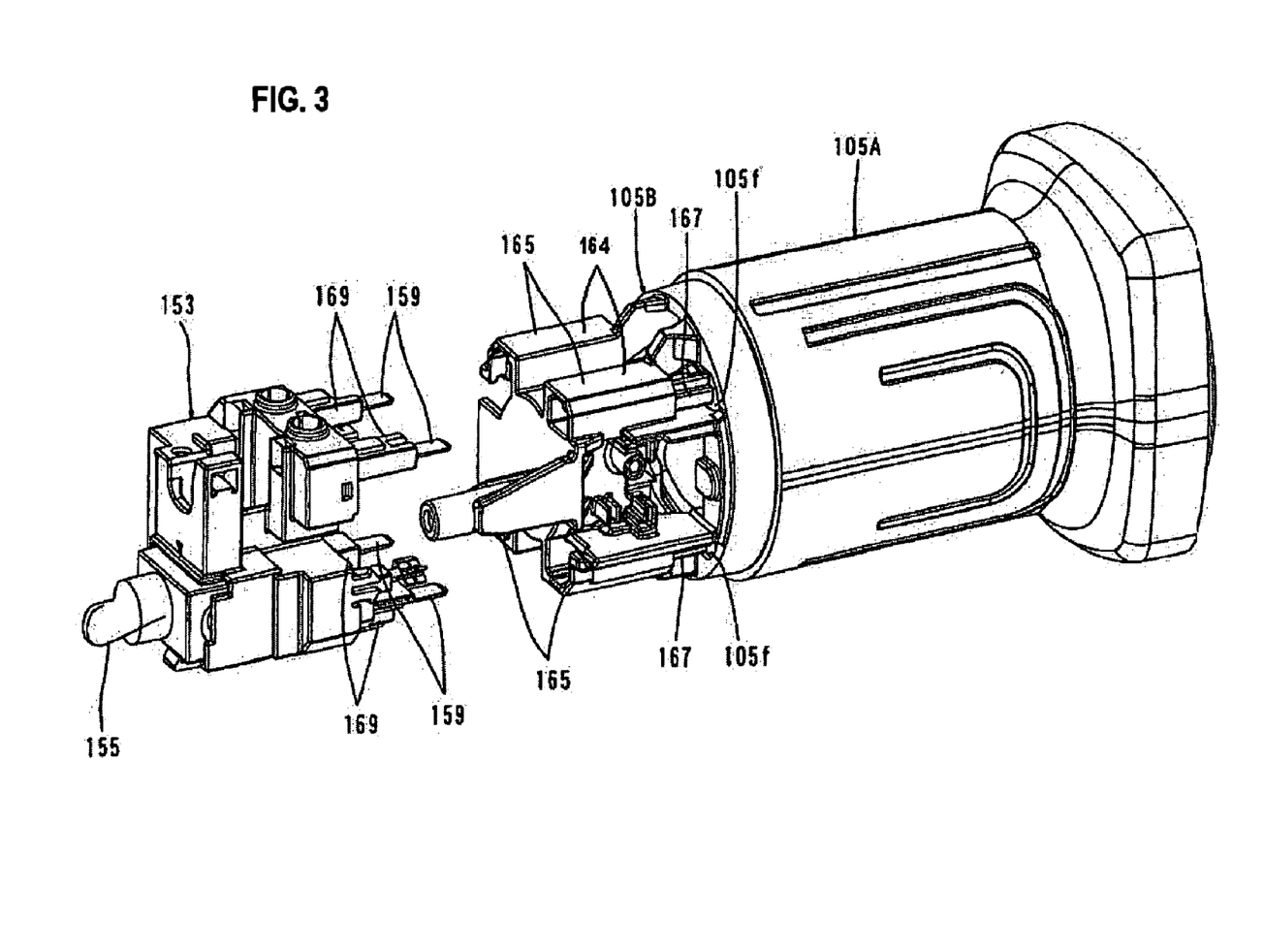
FIG. 3 is an exploded perspective view of the switch block and the motor housing, with the rear cover removed and not shown.
Figure 4:
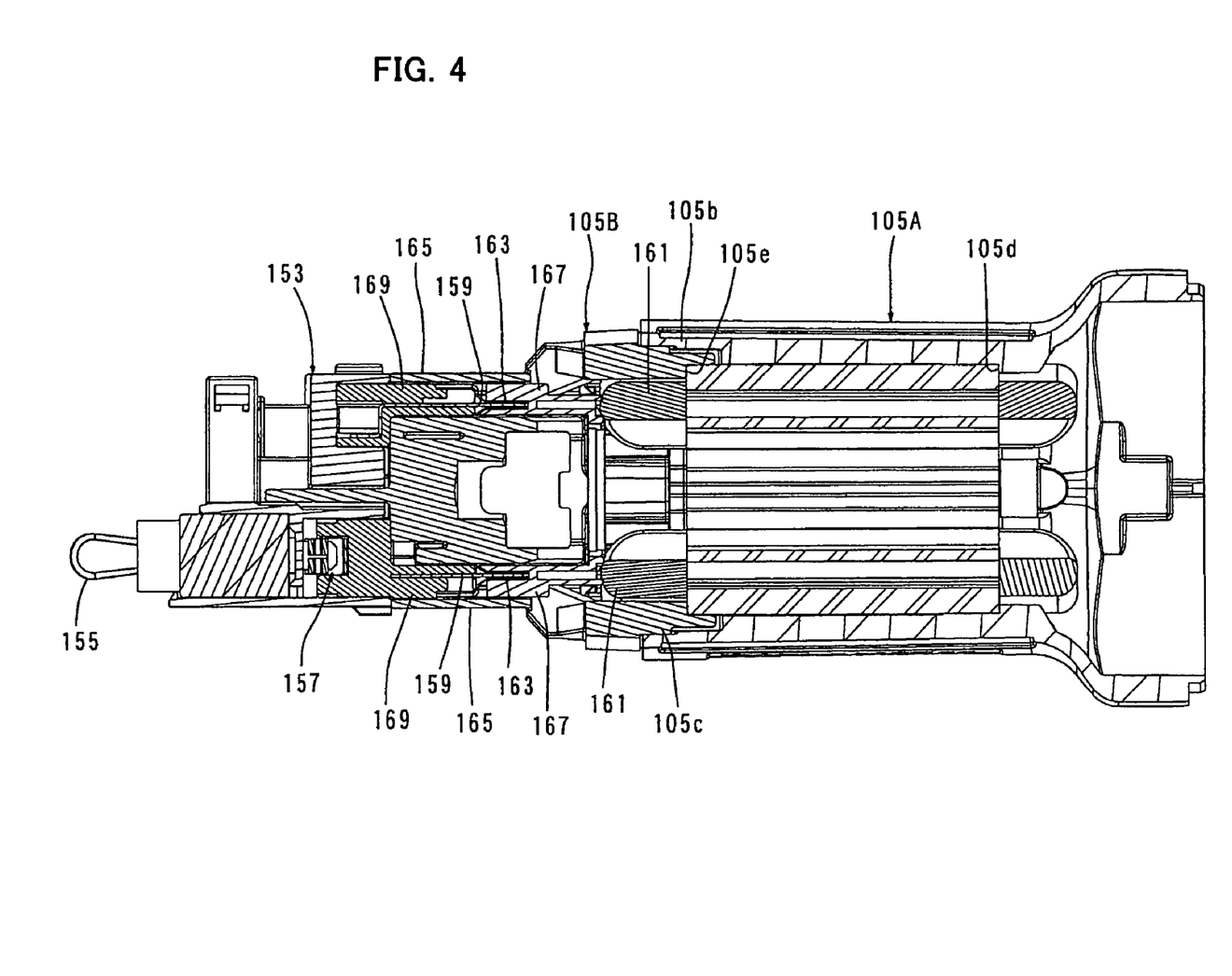
FIG. 4 is a sectional view of FIG. 2.
Figure 5:
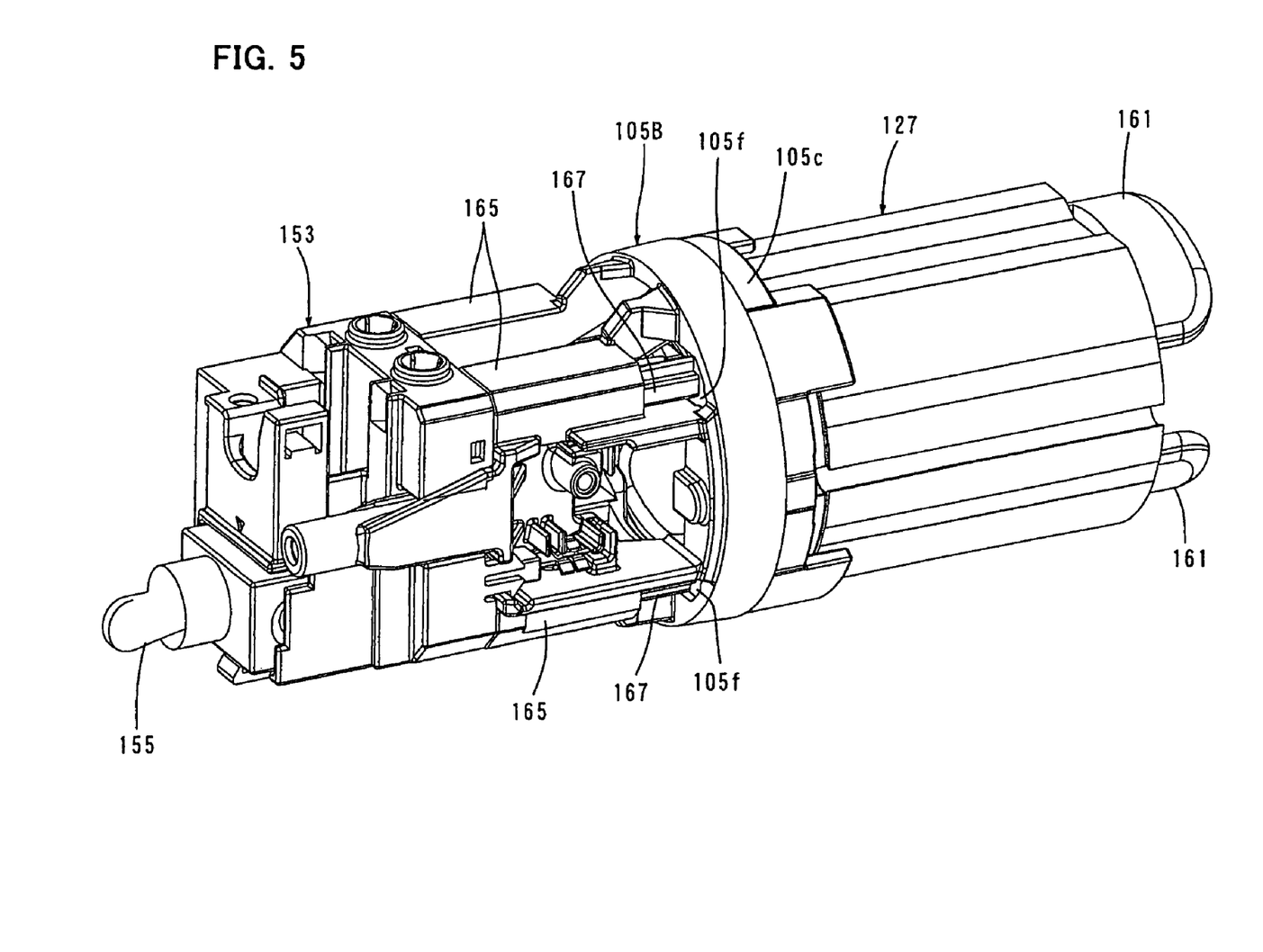
FIG. 5 is a perspective view showing a stator and the switch block which are mounted to a rear housing of the motor housing.
Figure 6:
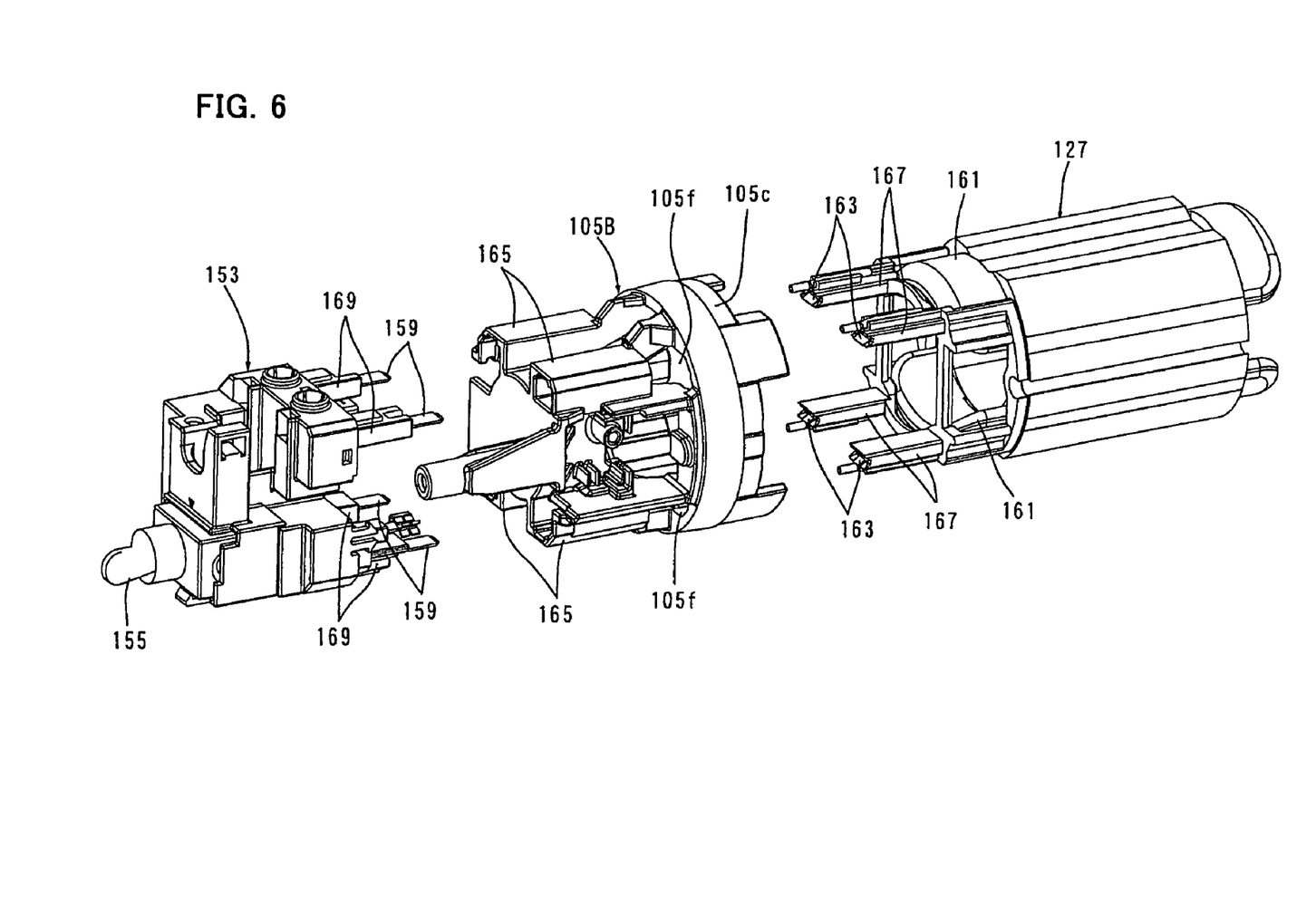
FIG. 6 is an exploded perspective view of the rear housing, the stator and the switch block.
Figure 7:
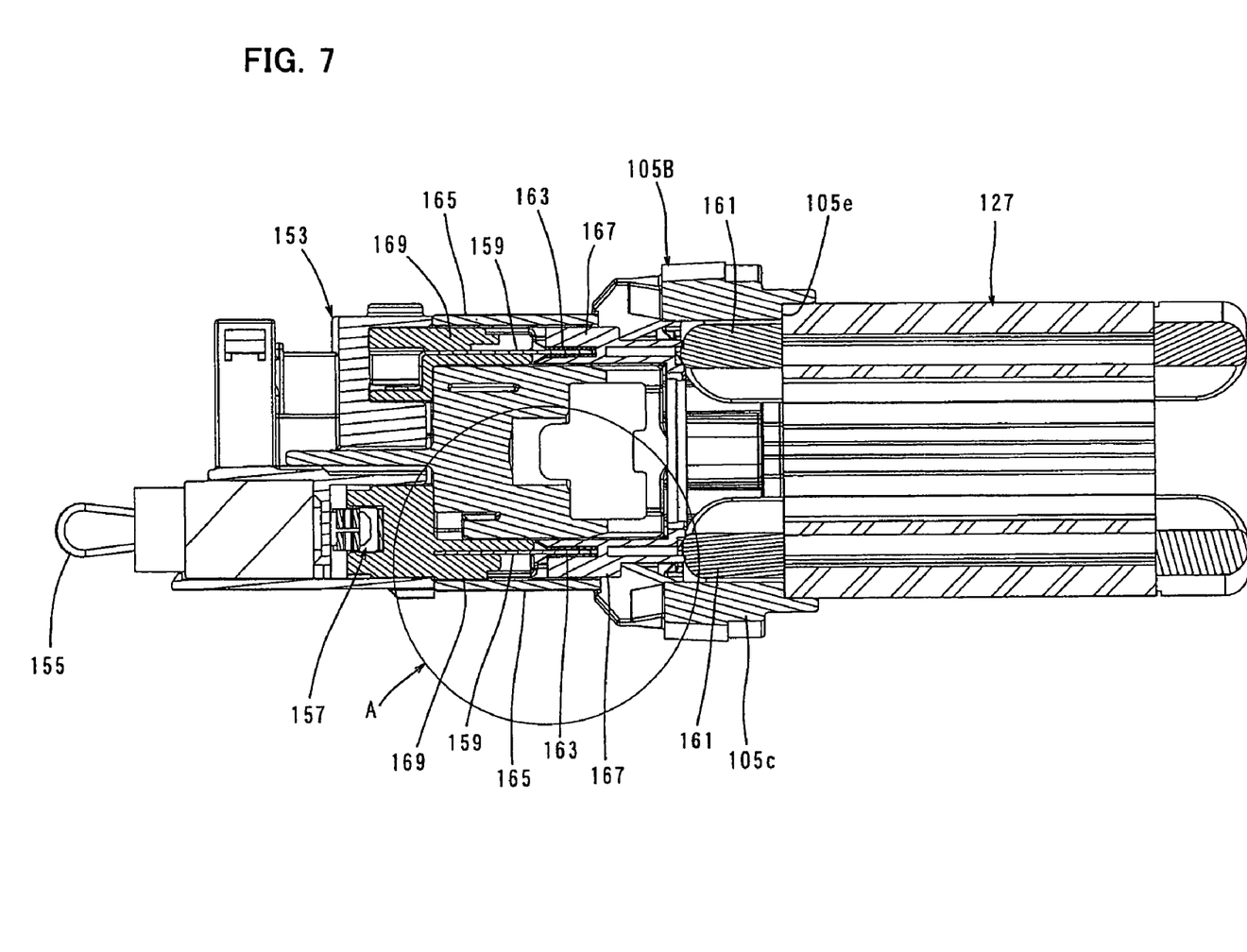
FIG. 7 is a sectional view of FIG. 5.
Figure 8:
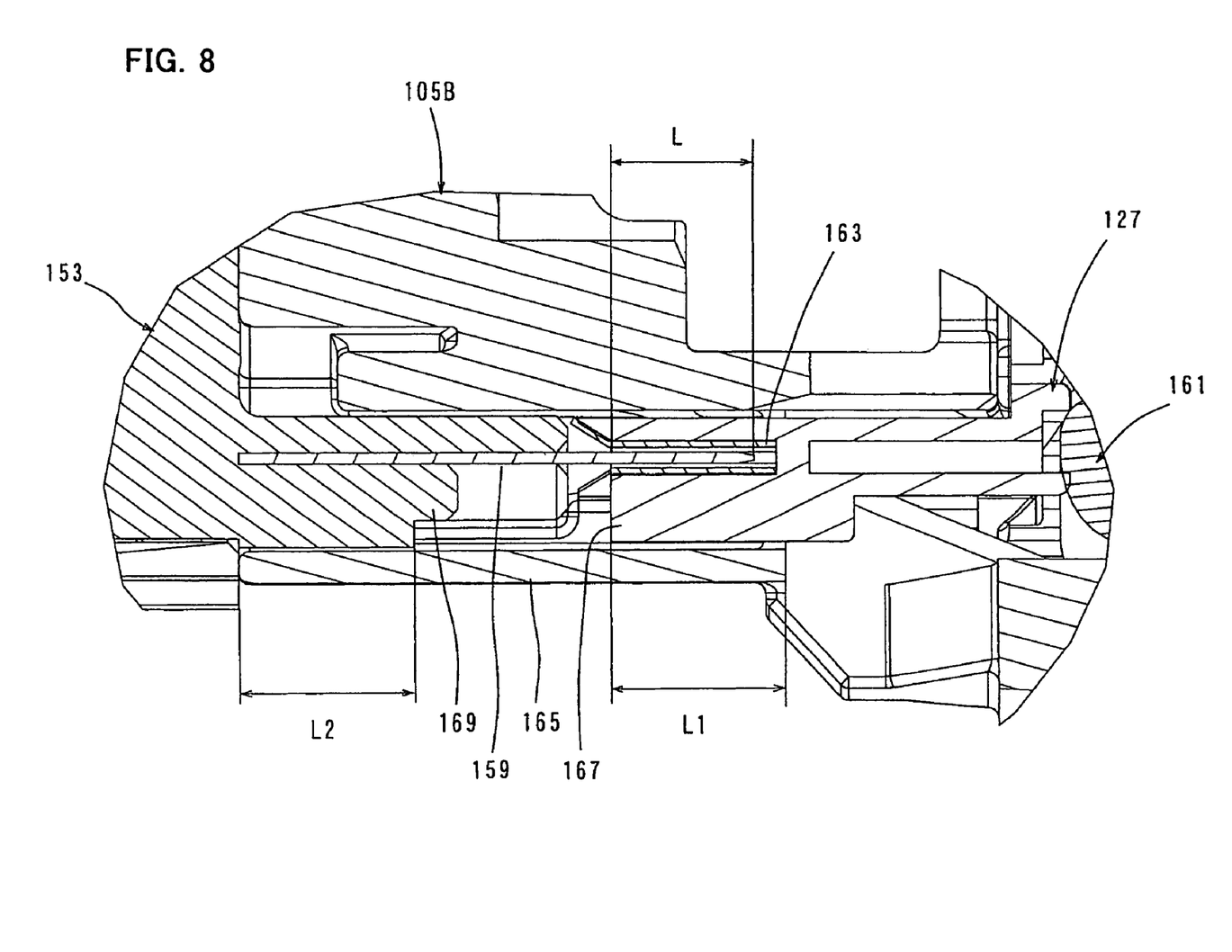
FIG. 8 is an enlarged view of part A in FIG. 7.

An embodiment of the invention is now described with reference to FIGS. 1 to 8. In this embodiment, a hand-held electric disc grinder which is used for grinding or polishing various kinds of workpiece, such as steel, concrete and stone, is explained as a representative example of a power tool according to the invention. FIG. 1 is a side view showing the entire structure of an electric disc grinder 101. FIG. 2 is a perspective view showing a switch block 153 mounted to a motor housing 105, with a rear cover 109 removed and not shown. FIG. 3 is an exploded perspective view of the switch block 153 and the motor housing 105, with the rear cover 109 removed and not shown. FIG. 4 is a sectional view of FIG. 2. FIG. 5 is a perspective view showing a stator 127 of a driving motor 121 and the switch block 153 which are mounted to a rear housing of the motor housing 105, and FIG. 6 is an exploded perspective view thereof. FIG. 7 is a sectional view of FIG. 5. Further, FIG. 8 is an enlarged view of part A in FIG. 7. In FIGS. 5 to 7, a front housing 105A of the motor housing 105 is not shown.

As shown in FIG. 1, the electric disc grinder 101 mainly includes a body 103 that forms an outer shell of the electric disc grinder 101, and a disc-like grinding wheel 119 disposed in the tip end region of the body 103. The body 103 mainly includes a motor housing 105, a gear housing 107 connected to one end of the motor housing 105, and a rear cover 109 removably connected to the other end of the motor housing 105. The grinding wheel 119 is a feature that corresponds to the "tool bit" according to this invention. For the sake of convenience of explanation, the side of the grinding wheel 119 (the right side as viewed in FIG. 1) is taken as the front side and the opposite side as the rear side in the longitudinal direction of the body 103.

As shown in FIGS. 2 to 4, the motor housing 105 is generally cylindrically shaped and houses the driving motor 121 (see FIG. 4). The motor housing 105 forms a grip part which is held by a user to perform an operation using the disc grinder 101. The driving motor 121 is arranged such that the direction of its axis of rotation coincides with the longitudinal direction of the disc grinder 101 or the longitudinal direction of the body 103. The driving motor 121 mainly includes a hollow stator 127 fixed to the motor housing 105, an armature rotatably disposed inside the stator 127, an output shaft and a commutator which rotate together with the armature, and a brush which supplies current to the commutator. In this embodiment, only the stator 127 of these motor components is shown in FIGS. 4 to 7, and the other main motor components are not shown. The driving motor 111 is a feature that corresponds to the "motor" according to this invention.

As shown in FIG. 1, the gear housing 107 is connected to a front end (right end as viewed in FIG. 1) of the motor housing 105 and houses a power transmitting mechanism 102 for transmitting the rotating output of the driving motor 121 to the grinding wheel 119. Substantially a rear half of the grinding wheel 119 is covered by a grinding wheel cover 108. The rotating output of the driving motor 121 is transmitted to the grinding wheel 119 as rotation in the circumferential direction via the power transmitting mechanism. The grinding wheel 119 is arranged on one end side (front side) of the motor housing 105 in its longitudinal direction (the longitudinal direction of the body 103) such that its axis of rotation is perpendicular to the axis of rotation of the driving motor 121.

The driving motor 121 is driven by electric power which is supplied from a power source (receptacle) via a power cord 171 (see FIG. 1). The switch block 153 (see FIGS. 2 to 4) is opposedly mounted to the rear end of the motor housing 105. The switch block 153 is a switch structure having a motor driving power switch 157 (see FIG. 4), an operation lever 155 for turning on and off the power switch 157, and a terminal connected to a power cord 171. The switch block 153 is normally housed within the rear cover 109 which is fitted over the rear end of the motor housing 105. The operation lever 155 is a feature that corresponds to the "operating part" according to this invention. As shown in FIG. 1, when the rear cover 109 is mounted to the motor housing 105, the operation lever 155 protrudes to the outside through a rear end opening of the rear cover 109 so that it can be operated by user. The driving motor 121 is started when the operation lever 155 is turned to the on position, while the driving motor 121 is stopped when the operation lever 155 is turned to the off position. Therefore, when the user holds the motor housing 105 and starts the driving motor 121 by operating the operation lever 155, the grinding wheel 119 is rotationally driven, so that a grinding or polishing operation or cutting operation can be appropriately performed on the workpiece.

The structure of mounting the stator 127 of the driving motor 121 and the switch block 153 to the motor housing 105, and the structure of connecting a stator coil 161 of a stator winding 161 of the driving motor 121 and a supply terminal 159 of the switch block 153.

The motor housing 105 of this embodiment has a split structure having a front housing 105A and a rear housing 105B in its longitudinal direction or the longitudinal direction of the body 103. The front housing 105A has a hollow internal space having both front and rear ends open in the longitudinal direction and has a stepped engagement portion 105b on its rear end. The rear housing 105A has a hollow internal space having only a front end open in the longitudinal direction and has a stepped engagement portion 105c on its front end. As shown in FIG. 4, the stator 127 of the driving motor 121 is inserted into the internal space of the front housing 105A through its rear opening, and in this state, the stepped engagement portions 105b, 105c are engaged with each other and fastened together by a fastening means (not shown) such as screws, so that the front housing 105A and the rear housing 105B are assembled together In the above-described assembling process, as shown in FIG. 4, when the stator 127 is inserted into the internal space of the front housing 105A, a front end surface of the stator 127 in the direction of insertion is held in contact with a receiving part in the form of an inner wall stepped surface 105d formed on the front housing 105A and extending in a direction transverse to its longitudinal direction. Then a rear end surface of the stator 127 in the direction of insertion is held in contact with a receiving part in the form of an inner wall stepped surface 105e formed on the rear housing 105B and extending in a direction transverse to its longitudinal direction. Specifically, the stator 127 is held from the both sides in the longitudinal direction by the inner wall stepped surface 105d of the front housing 105A and the inner wall stepped surface 105e of the rear housing 105B. In this state, the stator 127 is fastened together with the front housing 105A and the rear housing 105B by a fastening means such as screws which extend through the stator 127 in the longitudinal direction.

A plurality of (four) sleeves 165 are formed at predetermined intervals in the circumferential direction in an outside region of the rear housing 105B at the rear of the stepped engagement portion 105c (see FIG. 6 in particular). The sleeve 165 is a feature that corresponds to the "tubular member" according to this invention. Each of the sleeves 165 extends a predetermined length in the longitudinal direction of the rear housing 105B and has a hollow having a generally square section and having both ends open in the extending direction. Further, through holes 105f are formed in regions of the rear housing 105B which face the front openings of the sleeves 165 and provide communication between the internal space of the rear housing 105B and the outside.

Four columnar projections 167 are integrally formed on the rear end of the stator 127 and arranged in the circumferential direction so as to be assigned to the sleeves 165 (see FIG. 6 in particular). The columnar projection 167 is a feature that corresponds to the "fitting member" according to this invention. Each of the columnar projections 167 has a generally square contour which corresponds to the shape of the hollow of the assigned sleeve 165, and extends rearward in the longitudinal direction from the rear end of the stator 127. When the front housing 105A and the rear housing 105B are assembled together, the columnar projections 167 are inserted into the hollows of the sleeves 165 from the front through the through holes 105f of the rear housing 105B. Therefore, the sleeves 165 and the columnar projections 167 of the stator 127 serve as guides for mounting the stator 127 to the rear housing 105B. Here, the operation of fitting the columnar projections 167 of the stator 127 into the sleeves 165 of the rear housing 105B may precede the operation of assembling the front housing 105A and the rear housing 105B.

Four columnar projections 169 are integrally formed on the front end of the switch block 135 and arranged in the circumferential direction so as to be assigned to the sleeves 165 of the rear housing 105B (see FIGS. 3 and 6). The columnar projection 169 is a feature that corresponds to the "fitting member" according to this invention. Each of the columnar projections 169 has a generally square contour which corresponds to the shape of the hollow of the assigned sleeve 165, and extends forward in the longitudinal direction from the front end of the switch block 153. The columnar projections 169 are inserted into the hollows of the sleeves 165 of the rear housing 105B from the rear, so that the switch block 153 is mounted to the rear housing 105B (see FIGS. 2, 4 and 7). Preferably, the columnar projections 167, 169 are tightly fitted in the sleeves 165 without a clearance.

A rear cover 109 (see FIG. 1) having an internal space having a front opening is fitted over the rear housing 105B from the rear. Thus, the rear housing 105B and the switch block 153 are housed within the internal space of the rear housing 105B. Air vents 109b for intake of the outside air for cooling the motor are formed in the rear cover 109. When the driving motor 121 is driven, air is led into the internal space through the air vents 109b by rotation of the cooling fan which is not shown, and the air flows forward in the internal space of the front housing 105A through a clearance of the rear housing 105B. Thus, the driving motor 121 is cooled.

A coil terminal 163 of the stator winding 161 of the driving motor 121 is embedded in each of the columnar projections 167 of the stator 127. The coil terminal 163 is a feature that corresponds to the "motor-side terminal" according to this invention. The coil terminal 163 is provided and designed as a plug receptacle open at the rear end of the columnar projection 167. Further, a supply terminal 159 is provided on each of the columnar projections 169 of the switch block 153 and connected to the coil terminal 163. The supply terminal 159 is a feature that corresponds to the "switch-side terminal" according to this invention. The supply terminal 159 is provided and designed as a plug protruding a predetermined extent forward in the longitudinal direction from the front end of the columnar projection 169. The supply terminal 159 is inserted into the above-described socket which forms the coil terminal 163 of the stator winding 161 and electrically connected thereto.

Specifically, when the columnar projection 167 of the stator 127 and the columnar projection 169 of the switch block 153 are fitted into the hollow of the sleeve 165 of the rear housing 105B from the opposite sides in order to mount the stator 121 and the switch block 153 to the rear housing 105B, simultaneously by this fitting action, the plug in the form of the supply terminal 159 is inserted into the socket in the form of the coil terminal 163 so that the terminals are connected to each other. Thus the connection between the coil terminal 163 and the supply terminal 159 which are connected to each other within the hollow of the sleeve 165 is isolated from the outside of the sleeve 165 or the internal space of the rear cover 109 by the columnar projections 167, 169. The internal space of the rear cover 109 is a feature that corresponds to the "outside" according to this invention.

Further, as shown in FIG. 8, a length (depth) L1 of insertion of the columnar projection 167 of the stator 127 into the sleeve 165 and a length (depth) L2 of insertion of the columnar projection 169 of the switch block 153 into the sleeve 165 are designed to be larger than a length L of contact between the coil terminal 163 and the supply terminal 159 (or a depth of insertion of the plug into the socket). Therefore, even if the switch block 153 moves in a direction away from the rear housing 105B (rearward), for example, due to vibration which may be caused when the disc grinder 101 is driven, and the supply terminal 159 moves in a direction in which the supply terminal 159 is unplugged from the coil terminal 163, the columnar projection 169 is held in the inserted state in the sleeve 165 as long as the terminal connection is electrically connected. Thus, the terminal connection is held isolated from the outside of the sleeve 165 or the internal space of the rear cover 109.

As described above, according to this embodiment, when the columnar projection 167 of the stator 127 and the columnar projection 169 of the switch block 153 are fitted into the hollow of the sleeve 165 of the rear housing 105B from the opposite sides in order to mount the stator 121 and the switch block 153 to the rear housing 105B, simultaneously, the supply terminal 159 is connected to the coil terminal 163 by a plug-and-socket type connection. With this construction, a separate process of connecting the coil terminal 163 and the supply terminal 159 is not additionally required, so that ease of mounting operation can be increased.

Further, according to this embodiment, the coil terminal 163 of the stator winding 161 and the supply terminal 159 of the switch block 153 are connected to each other within the hollow of the sleeve 165 so as to be isolated from the outside of the sleeve 165. This isolated state is maintained even if the switch block 153 moves in a direction away from the rear housing 105B (rearward), for example, due to vibration which may be caused when the disc grinder is driven. With this construction, metal chips or the like which enter through the vents 109b of the rear cover 109 during operation of grinding or polishing a workpiece can be prevented from sticking to the terminal connection, so that leakage of current and short circuit can be prevented.

Further, in this embodiment, the motor housing 105 has a split structure having the front housing 105A and the rear housing 105B in its longitudinal direction, and the stator 127 of the driving motor 121 is held from the both sides in the longitudinal direction by the front housing 105A and the rear housing 105B and fastened together by screws or the like. With this construction, the stator 127 can be securely fastened to the motor housing 105.

Further, in this embodiment, the disc grinder 101 is described as a representative example of the power tool, but this invention can be applied to any power tool having a switch block 153 which is mounted on the rear end of the motor housing 105 and provided with a power switch for starting and stopping the driving motor 121 and an operation knob for operating the power switch can be applied.

Further, in this embodiment, the motor housing 105 is described as having a split structure having the front housing 105A and the rear housing 105B, but the motor housing 105 may have a one-piece structure. In this case, too, the assembling structure using the sleeve 165 and the columnar projections 167, 169 and the structure of connecting the coil terminal 163 and the supply terminal 159 can be similarly constructed.

Further, as for the structure of fitting the columnar projections 167, 169 into the sleeve 165, a rubber ring 164 or the like may be disposed between the inner circumferential surface of the sleeve 165 and an outer circumferential surface of the columnar projections 167, 169 such that the hollow of the sleeve 165 is sealed.

Further, in this embodiment, the sleeve 165 is provided on the motor housing 105 and the columnar projections 167, 169 are provided on the stator 127 and the switch block 153, but the columnar projections 167, 169 may be provided on the motor housing 105 and the sleeve 165 may be provided on the stator 127 and the switch block 153.

With this construction, the stator of the motor is held from both sides by the front and rear housings and fastened thereto, so that the stator can be securely fastened to the motor housing.

Description of Numerals
101 electric disc grinder (power tool)
103 body
105 motor housing
105A front housing
105B rear housing
105b stepped engagement portion
105c stepped engagement portion
105d inner wall stepped surface
105e inner wall stepped surface
105f through hole
107 gear housing
108 grinding cover
109 rear cover
109b vent
119 grinding wheel (tool bit)
121 driving motor (motor)
127 stator
153 switch block
155 operation lever
157 power switch
159 supply terminal (switch-side terminal)
161 stator winding
163 coil terminal
165 sleeve
167 columnar projection (fitting member)
169 columnar projection (fitting member)
171 power cord

The invention claimed is:
1. A power tool comprising:
a motor housing,
  a motor housed within the motor housing,
  a power transmitting mechanism that transmits power of the motor to drive a tool bit and thereby causes the tool bit to perform a predetermined operation,
  a motor-side terminal provided on the motor,
  a switch block oppositely mounted to one longitudinal end of the motor housing and having an operating part which can be operated to start and stop the motor, a switch-side terminal provided on the switch block to be connected to the motor-side terminal,
  a hollow tubular member provided on one of the motor housing and the switch block and extending in a longitudinal direction of the motor housing, and
  a fitting member provided on the other of the motor housing and the switch block and fitted in the tubular member, wherein:
  the motor-side terminal and the switch-side terminal are connected to each other within a hollow of the tubular member, and as long as the motor-side terminal and the switch-side terminal are at least connected to each other, the tubular member and the fitting member are held in the fitted state so that a connection between the terminals is isolated from the outside of the tubular member.
2. The power tool as defined in claim 1, wherein:
one of the motor-side terminal and the switch-side terminal comprises a socket and the other comprises a plug that is inserted into the socket along the longitudinal direction of the motor housing, and plug-in connection between the socket and the plug is made within the hollow of the tubular member, and when the switch block is mounted to one end of the motor housing along the longitudinal direction of the motor housing, the tubular member and the fitting member are fitted together along the longitudinal direction of the motor housing, and simultaneously by said fitting action, the plug is inserted into the socket.

3. The power tool as defined in claim 2, wherein:

a stator of the motor and the switch block are mounted to the motor housing from opposite directions along the longitudinal direction of the motor housing, the tubular member is formed on the motor housing, and the fitting member is formed on a front end of the stator of the motor and a front end of the switch block in their respective mounting directions, in order to mount the stator of the motor and the switch block to the motor housing, the motor-side fitting member and the switch block-side fitting member are fitted in the tubular member, and said fitting guides the stator of the motor and the switch block to be mounted to the motor housing.

4. The power tool as defined in claim 3, wherein a rubber ring is disposed between the tubular member and the fitting member.

5. The power tool as defined in claim 3, wherein:

the motor housing houses the stator of the motor in the longitudinal direction and has a split structure having a front housing which has a receiving surface for contact with one end of the stator in the longitudinal direction and a rear housing to which the switch block is mounted and which has a receiving surface for contact with the other end of the stator in the longitudinal direction, and the front housing and the rear housing are joined together with the stator held from both sides by the receiving surfaces of the front and rear housings.

6. The power tool as defined in claim 2, wherein a rubber ring is disposed between the tubular member and the fitting member.

7. The power tool as defined in claim 1, wherein:

a stator of the motor and the switch block are mounted to the motor housing from opposite directions along the longitudinal direction of the motor housing, the tubular member is formed on the motor housing, and the fitting member is formed on a front end of the stator of the motor and a front end of the switch block in their respective mounting directions, in order to mount the stator of the motor and the switch block to the motor housing, the motor-side fitting member and the switch block-side fitting member are fitted in the tubular member, and said fitting guides the stator of the motor and the switch block to be mounted to the motor housing.

8. The power tool as defined in claim 7, wherein:

the motor housing houses the stator of the motor in the longitudinal direction and has a split structure having a front housing which has a receiving surface for contact with one end of the stator in the longitudinal direction and a rear housing to which the switch block is mounted and which has a receiving surface for contact with the other end of the stator in the longitudinal direction, and the front housing and the rear housing are joined together with the stator held from both sides by the receiving surfaces of the front and rear housings.

9. The power tool as defined in claim 7, wherein a rubber ring is disposed between the tubular member and the fitting member.

10. The power tool as defined in claim 1, wherein a rubber ring is disposed between the tubular member and the fitting member.

* * * * *